United States Patent
Yoshikawa et al.

(10) Patent No.: US 7,306,257 B2
(45) Date of Patent: Dec. 11, 2007

(54) OCCUPANT PROTECTION SYSTEM

(75) Inventors: Hiromichi Yoshikawa, Shiga (JP); Katsuyuki Sakai, Shiga (JP)

(73) Assignee: Takata Corporation, Minato-Ku, Tokyo (JP)

( * ) Notice: Subject to any disclaimer, the term of this patent is extended or adjusted under 35 U.S.C. 154(b) by 241 days.

(21) Appl. No.: 10/842,232

(22) Filed: May 10, 2004

(65) Prior Publication Data

US 2005/0046156 A1    Mar. 3, 2005

(30) Foreign Application Priority Data

Aug. 26, 2003 (JP) .............................. 2003-301607

(51) Int. Cl.
 *B60R 21/16* (2006.01)
(52) U.S. Cl. ................. 280/728.2; 280/730.1; 297/216.1
(58) Field of Classification Search ............. 280/728.2, 280/743.1, 730.1; 297/216.1
See application file for complete search history.

(56) References Cited

U.S. PATENT DOCUMENTS

| | | | | |
|---|---|---|---|---|
| 5,992,882 | A * | 11/1999 | Ito et al. .................. | 280/743.1 |
| 6,196,577 | B1 | 3/2001 | Aoki et al. | |
| 6,357,786 | B1 * | 3/2002 | Higashi .................... | 280/728.2 |
| 6,543,803 | B1 * | 4/2003 | Harada et al. ............ | 280/730.2 |
| 6,578,866 | B2 * | 6/2003 | Higashi .................... | 280/728.2 |
| 6,669,226 | B2 * | 12/2003 | Fowler et al. ............ | 280/728.2 |
| 6,935,684 | B2 * | 8/2005 | Sakai ...................... | 297/216.1 |
| 2001/0011810 | A1 | 8/2001 | Saiguchi et al. | |
| 2002/0003365 | A1 | 1/2002 | Yamaguchi et al. | |
| 2006/0017266 | A1 * | 1/2006 | Yoshikawa et al. ...... | 280/730.1 |
| 2007/0132214 | A1 * | 6/2007 | Suzuki et al. ............ | 280/730.1 |

FOREIGN PATENT DOCUMENTS

| | | |
|---|---|---|
| JP | 5-229378 | 9/1993 |
| JP | 10-217818 | 8/1998 |
| JP | 10217818 | 8/1998 |
| JP | 2002-79863 | 3/2002 |
| JP | 2002264749 | 9/2002 |
| JP | 2002-283900 | 10/2002 |

* cited by examiner

*Primary Examiner*—Paul N. Dickson
*Assistant Examiner*—Drew J. Brown
(74) *Attorney, Agent, or Firm*—Fitch, Even, Tabin & Flannery

(57) ABSTRACT

An occupant protection system in which an airbag module can easily be mounted to a seat is provided. A retainer is placed on the inner surface of the lower part of an airbag. Stud bolts projecting downward from the lower surface of the retainer are passed through bolt insertion holes of the airbag, to which first nuts are tightened from the exterior of the airbag through a patch; thus, the airbag is joined to the retainer. A gas generator is joined to the retainer with a bracket. A seat pan has a recess for accommodating the patches and the first nuts when the retainer to which the airbag and the gas generator have been joined in advance is mounted thereto.

16 Claims, 9 Drawing Sheets

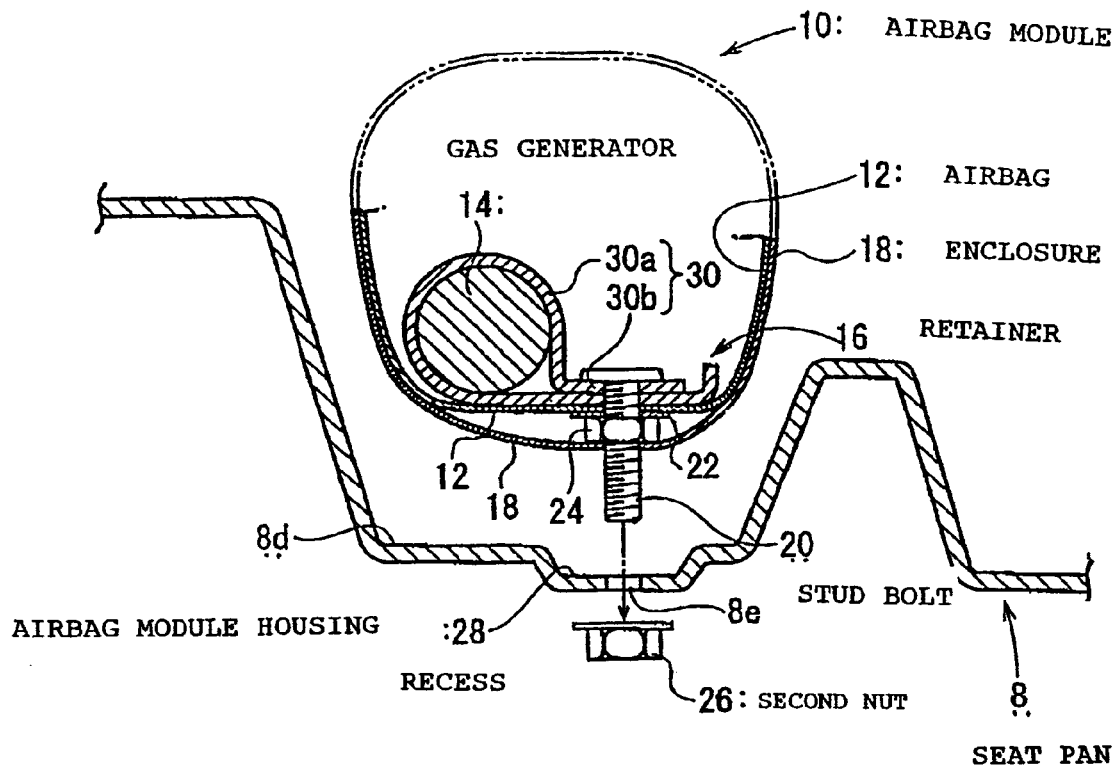
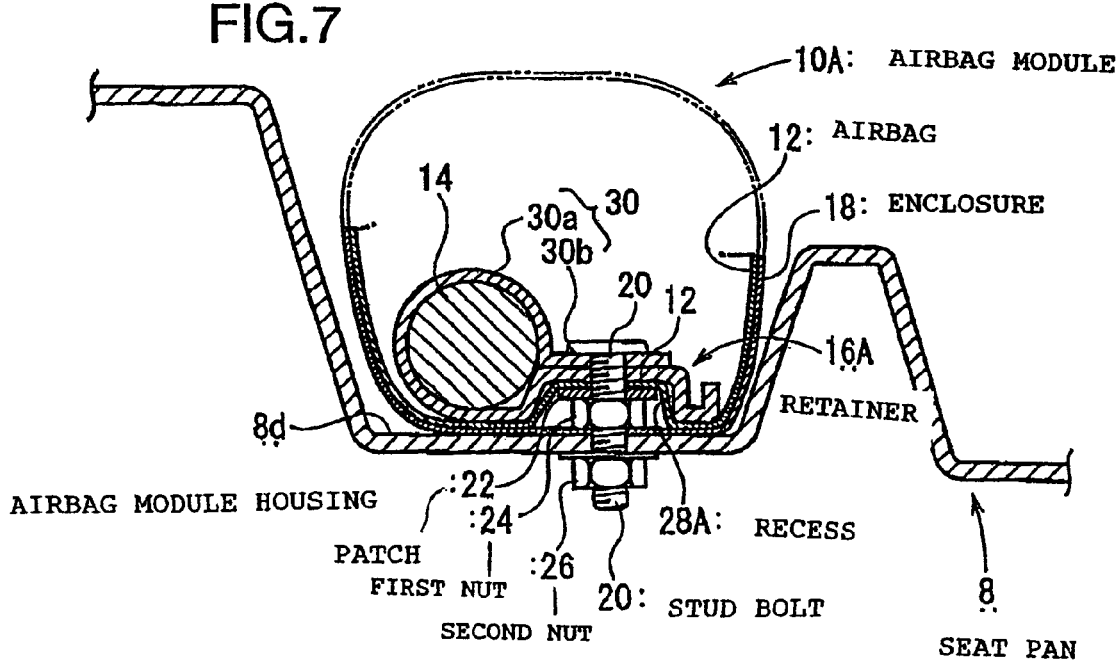

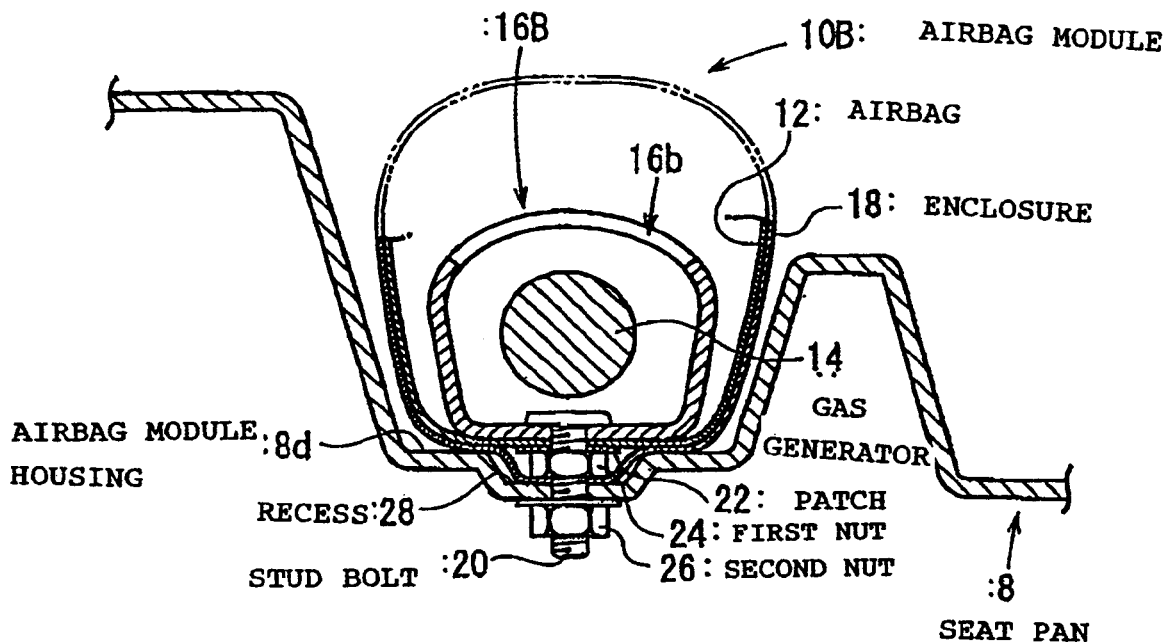

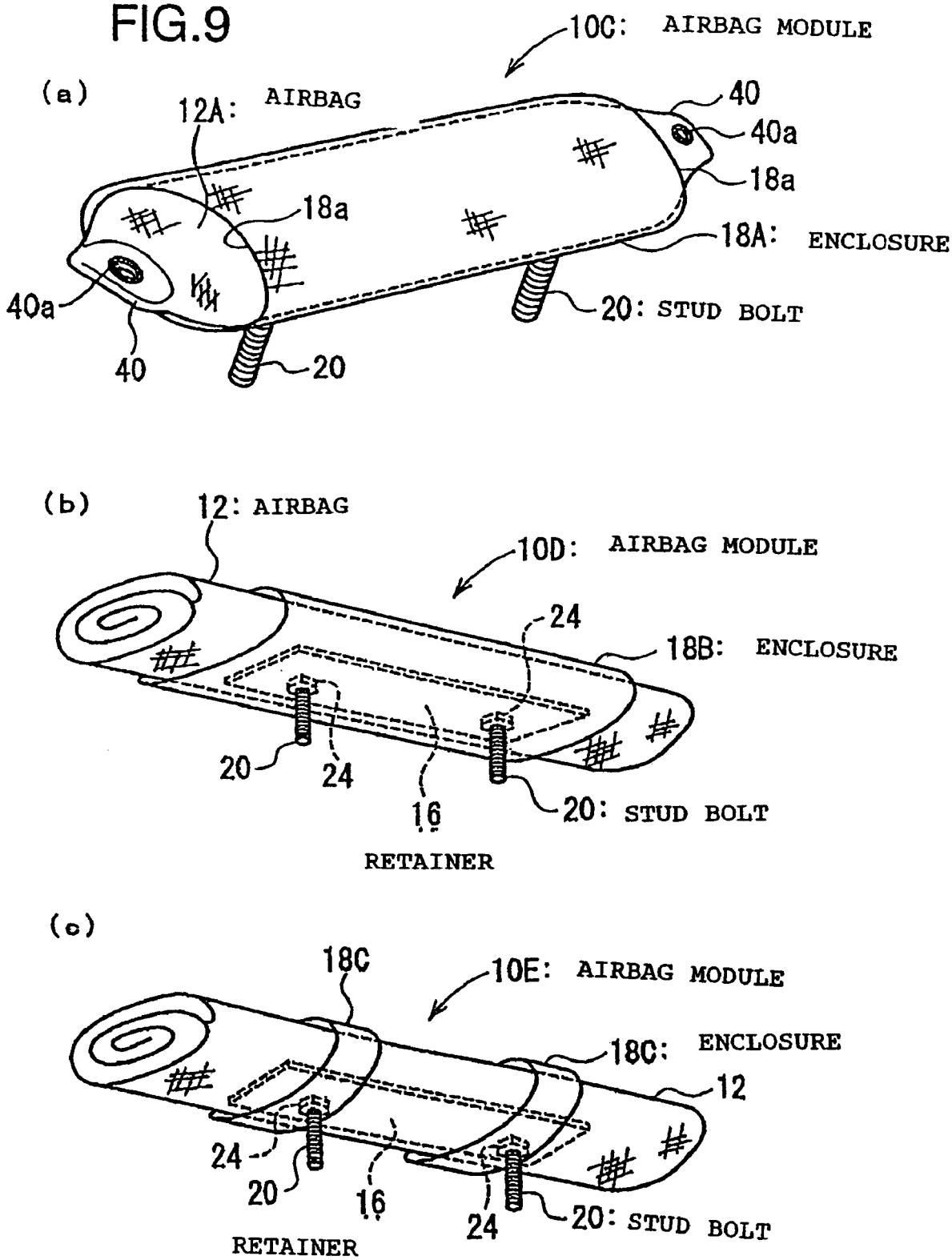

OCCUPANT PROTECTION SYSTEM

FIELD OF THE INVENTION

The present invention relates to an occupant protection system for protecting an occupant of a vehicle such as a car in the event of a crash and, more specifically, it relates to an occupant protection system for preventing the body of the occupant from moving forward and downward by restraining the waist of the occupant during a front crash.

BACKGROUND OF THE INVENTION

As a system for protecting an occupant in the event of a car crash, Japanese Unexamined Patent Application Publication No. 10-217818 describes an occupant protection system in which the front of a seat cushion is increased in height or hardened during the car crash to prevent a so-called submarine phenomenon such that the occupant passes under a lap belt during a front crash even with a seat belt.

The occupant protection system disclosed in the patent has a recess in the front of a seat pan, in which an airbag is arranged.

A cylindrical inflator is disposed in the airbag, from which a stud bolt projects downward. The bolt passes through the airbag and a seat pan and projects downward therefrom. A nut is tightened to the bolt, so that the inflator is drawn to the seat pan and fixed thereto and the bottom of the airbag is clamped between the inflator and the seat pan; the airbag is thus joined to the seat pan.

With the occupant protection system described in the Japanese Unexamined Patent Application Publication No. 10-217818, the stud bolt of the inflator is passed through the hole of the airbag and further passed through the hole of the seat pan. The bolt, however, comes off easily from the hole of the airbag before the bolt is passed through the hole of the seat pan, having the problem of burdensome assembly work.

SUMMARY OF THE INVENTION

Accordingly, it is an object of the present invention to provide an occupant protection system in which an airbag module can easily be joined to a seat.

An occupant protection system according to the present invention includes: an airbag disposed between a seat pan and a seat cushion and inflatable to push the seat cushion from below; and a gas generator disposed in the airbag, the airbag and the gas generator being joined to the seat pan. The airbag and the gas generator are joined to the seat pan after the airbag and the gas generator have been joined together.

In the occupant protection system of the invention, the airbag and the gas generator are joined together before the airbag and the gas generator are joined to the seat pan, which are then joined integrally to the seat pan. Accordingly, the bolt does not come off from the hole of the airbag when the airbag and the gas generator are mounted to the seat pan, proving efficient work.

According to an aspect of the invention, a bolt projects from the gas generator or the gas-generator retainer, the bolt passing through the airbag and the seat pan; the airbag and the gas generator are joined together by a first nut being tightened to the bolt; and the airbag and the gas generator are joined to the seat pan by a second bolt being tightened to the bolt. Since the first nut is tightened to the bolt in advance, in this way, the airbag and the gas generator are easily integrated. Moreover, the coming-off of the bolt from the hole of the airbag can reliably be prevented.

In the invention, preferably, the seat pan has a recess for accommodating the first nut.

With such a structure, the height of the installation of the airbag and the gas generator can be decreased. In other words, the airbag and the gas generator are not arranged in a higher position corresponding to the thickness of the first nut, even with the first nut provided.

BRIEF DESCRIPTION OF THE DRAWINGS

FIG. 6 is an exploded view of the airbag module and the seat pan of the occupant protection system of FIG. 1.

FIG. 7 is a longitudinal sectional view of an occupant protection system according to another embodiment of the invention.

FIG. 8 is a longitudinal sectional view of an occupant protection system according to still another embodiment of the invention.

FIG. 9 includes perspective views of other arrangements of an enclosure.

DETAILED DESCRIPTION OF THE PREFERRED EMBODIMENTS

Figure 1:
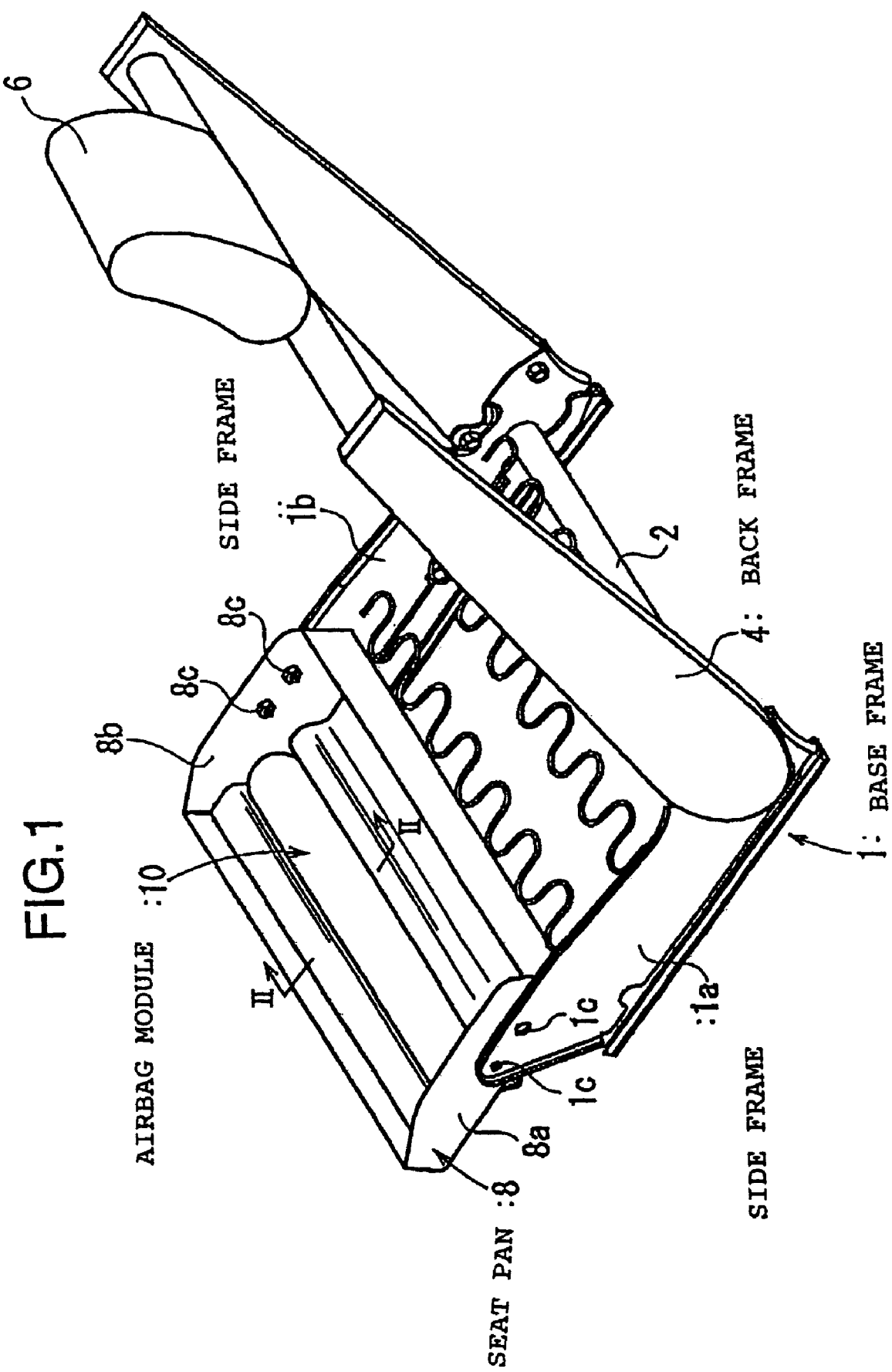
FIG. 1 is a perspective view of the frame of a seat including an occupant protection system according to an embodiment of the present invention.
Figure 2:
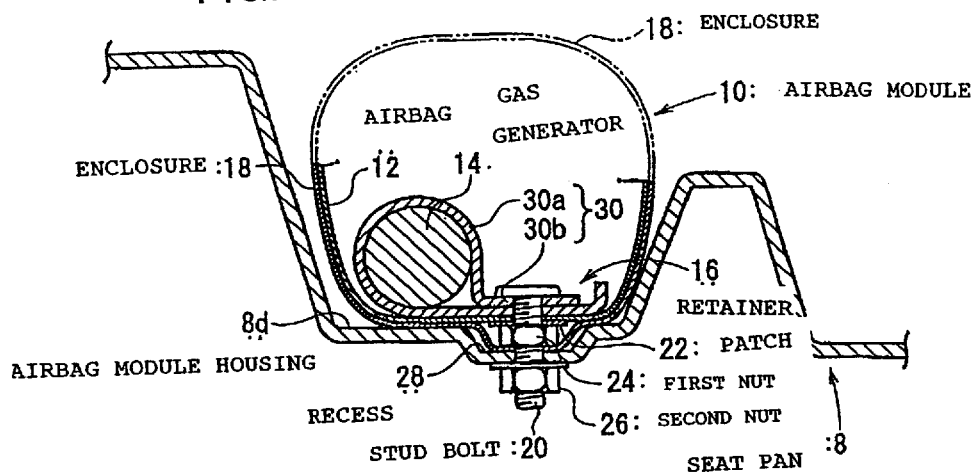
FIG. 2 is a sectional view taken along line II-II of FIG. 1.
Figure 3:
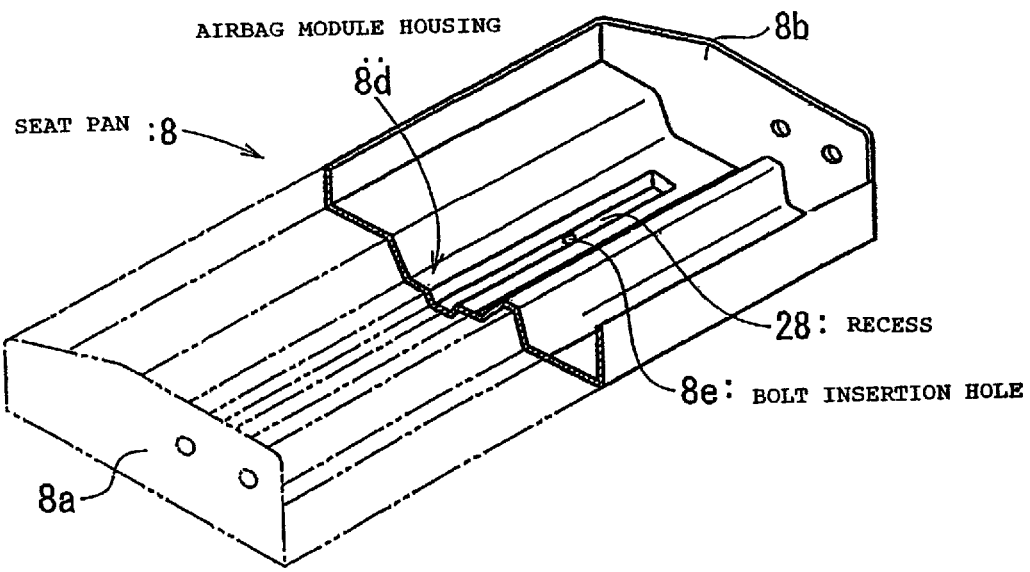
FIG. 3 is a perspective sectional view of a seat pan of the occupant protection system of FIG. 1.
Figure 4:
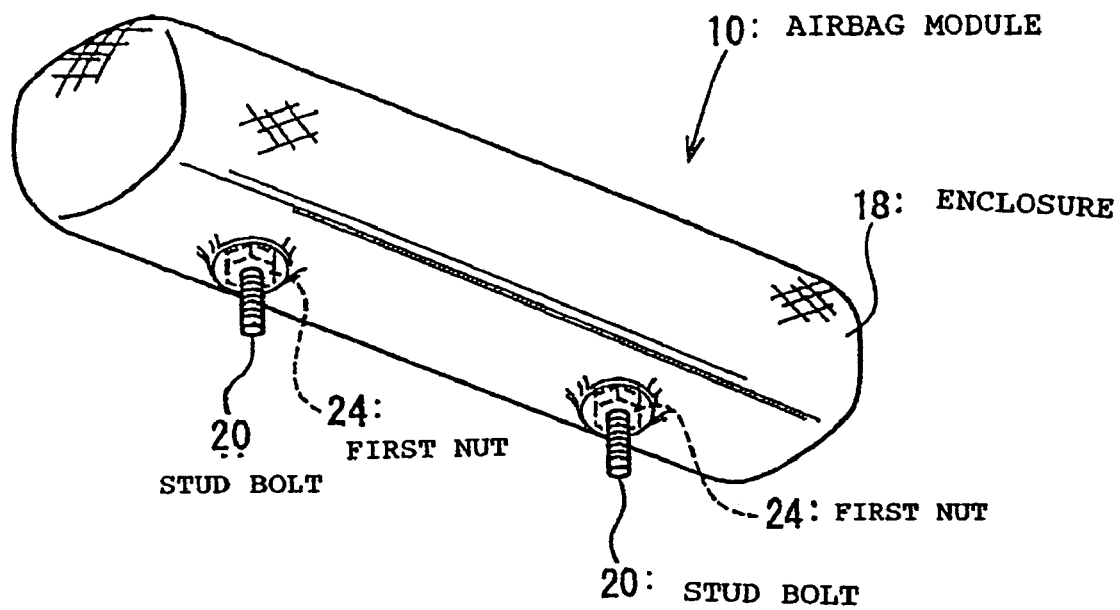
FIG. 4 is a perspective view of an airbag module of the occupant protection system of FIG. 1.
Figure 5:
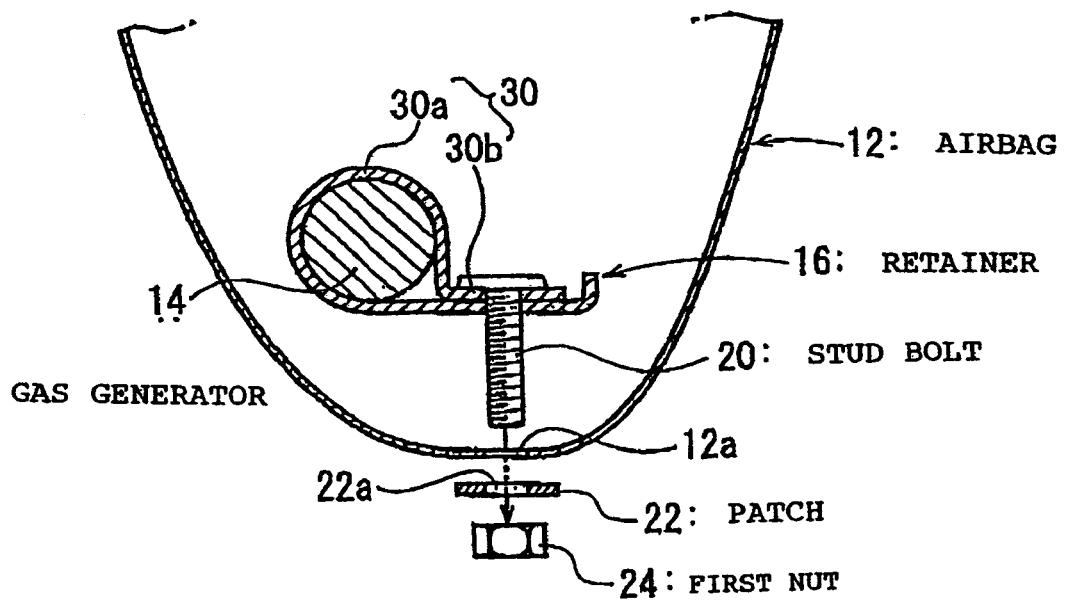
FIG. 5 is an exploded view of the airbag module of the occupant protection system of FIG. 1.

An embodiment of the present invention will be described with reference to the drawings. FIG. 1 is a perspective view of the frame of a seat including an occupant protection system according to the embodiment of the present invention; FIG. 2 is a sectional view taken along line II-II of FIG. 1; FIG. 3 is a perspective sectional view of a seat pan; FIG. 4 is a perspective view of an airbag module of the occupant protection system, viewed from below; FIG. 5 is an exploded view of the airbag module; and FIG. 6 is an exploded view of the airbag module and the seat pan.

The frame of the car seat includes a base frame 1 and a back frame 4 rotatably joined to the base frame 1 through a support shaft 2 and a reclining device (not shown). The back frame 4 has a headrest 6 thereon.

The base frame 1 has left and right side frames 1a and 1b. A seat pan 8 is placed between the front of the side frames 1a and 1b. The seat pan 8 has side walls 8a and 8b rising from the left and right opposite ends thereof, which overlap with the inner sides of the side frames 1a and 1b (opposing sides of the side frames 1a and 1b). The side frames 1a and 1b and the side walls 8a and 8b each have bolt insertion holes (not shown) so as to pass through the overlapping frames and side walls, into which bolts 1c are each inserted and nuts 8c are tightened to the bolts 1c, so that the seat pan 8 is fixed between the side frames 1a and 1b.

The base frame 1 and the back frame 4 include a seat cushion and a seatback (not shown), made of urethane or the like, respectively. The seat pan 8 is arranged under the front of the seat cushion.

The seat pan 8 has an airbag module 10 of the occupant protection system mounted thereto.

The airbag module 10 is arranged between the seat pan 8 and the seat cushion, in a folded condition. The airbag module 10 includes an airbag 12 which is inflated to push the seat cushion from below by the introduction of gas, a gas generator 14 for inflating the airbag 12, a retainer 16 to which the airbag 12 and the gas generator 14 are joined and which is fixed to the seat pan 8 with later-described stud bolts 20, and an enclosure 18 that encloses the folded airbag 12 so as to restrain the airbag 12 in the folded condition. The airbag 12 is arranged so as to extend along the lateral width of the seat pan 8 (along the vehicle width).

In this embodiment, the seat pan 8 has, on the top, an airbag module housing 8*d* (refer to FIG. 3) formed of a recessed step that is reduced in height by the length corresponding to the height (vertical size) of the airbag module 10. The airbag module 10 is disposed in the airbag module housing 8*d*.

The retainer 16 in this embodiment is shaped like a plate extending along the bottom of the airbag module housing 8*d*. The retainer 16 is disposed in the airbag 12, in contact with the inner surface of the lower part of the airbag 12 so as to push the lower part of the airbag 12 against the bottom of the airbag module housing 8*d* from the interior of the airbag 12. From the lower surface of the retainer 16, the stud bolts 20 project downward. The stud bolts 20 each project to the exterior of the airbag 12 through a bolt insertion hole 12*a* (refer to FIG. 5) formed in the lower part of the airbag 12. The airbag 12 is joined to the retainer 16 such that first nuts 24 are tightened to the stud bolts 20 from the exterior of the airbag 12 through patches 22. Numeral 22*a* of FIG. 5 denotes a bolt insertion hole of each patch 22 through which the stud bolt 20 is passed.

The enclosure 18 is routed under the airbag 12 so as to cover the first nuts 24. The stud bolts 20 extend further downward through the enclosure 18.

The stud bolt 20 is further passed through a bolt insertion hole 8*e* (refer to FIG. 6) formed in the bottom of the airbag module housing 8*d*. A second nut 26 is tightened to the stud bolt 20 from below the seat pan 8; thus, the retainer 16 is fixed to the bottom of the airbag module housing 8*d*.

Referring to FIG. 6, the airbag module housing 8*d* has a recess 28 in the bottom, which has a depth that can accommodate the patches 22 placed on the outer surface of the lower part of the airbag 12, the first nuts 24, and so on entirely when the retainer 16 is arranged along the bottom. The width of the recess 28 is smaller than that of the retainer 16. The bolt insertion holes 8*e* are arranged in the recess 28.

Accordingly, as shown in FIG. 2, when the stud bolts 20 are passed through the bolt insertion holes 8*e*, on which the nuts 26 are tightened from below the seat pan 8, the patches 22 and the first nuts 24 are accommodated in the recess 28, and so the retainer 16 is brought into close contact with the bottom of the airbag module housing 8*d* through the ground fabric of the airbag 12.

The gas generator 14 is mounted to the upper surface of the retainer 16 with a bracket 30. The gas generator 14 is substantially cylindrical in this embodiment, which is arranged in the airbag 12 such that the axis is directed along the lateral width of the seat pan 8. The bracket 30 projects from the front rim of the retainer 16 (the rim on the front of the vehicle) and includes a C-shaped band 30*a* curved in substantially C-shape on the upper surface of the retainer 16 and a flange 30*b* extending from the end of the C-shaped band 30*a* so as to cover the upper surface of the retainer 16. The stud bolts 20 project downward from the lower surface of the flange 30*b* and pass through the retainer 16 to extend downward therefrom.

The gas generator 14 is inserted into the C-shaped band 30*a* and then the first nuts 24 are tightened to the stud bolt 20 to clamp the flange 30*b* and the retainer 16 by pressure, so that the gas generator 14 is fixed to the retainer 16.

The enclosure 18 of this embodiment is shaped like a bag that encloses the entire folded airbag 12, as shown in FIG. 4. The perimeter of the enclosure 18 is set shorter than that of the inflated airbag 12 and so the maximum perimeter of the inflated airbag 12 is limited to the perimeter of the enclosure 18 to increase the inner pressure of the airbag 12.

In the occupant protection system with such a structure, the airbag module 10 is assembled to the state of FIG. 4 in which the airbag 12 and the gas generator 14 are each joined to the retainer 16 before it is mounted to the seat pan 8, the airbag 12 is folded, and the enclosure 18 is mounted to the folded airbag 12.

More specifically, the gas generator 14 is inserted into the C-shaped band 30*a* of the bracket 30 in advance and the retainer 16 is disposed inside the airbag 12. Referring to FIG. 5, the stud bolts 20 are inserted into the bolt insertion holes 12*a* at the lower part of the airbag 12. Subsequently, the first nuts 24 are tightened to the stud bolts 20 from the exterior of the airbag 12 through the patch 22 to join the airbag 12 and the retainer 16 together. At that time, the flange 30*b* of the bracket 30 and the retainer 16 are clamped by the tightening of the first nuts 24; thus, the gas generator 14 is fixed to the retainer 16. Thereafter the airbag 12 is folded and then the enclosure 18 is covered over the folded airbag 12.

The airbag module 10 assembled in that way is then disposed in the airbag module housing 8*d* of the seat pan 8. At that time, the stud bolts 20 are inserted into the bolt insertion holes 8*e*, to which the second nuts 26 are tightened to the stud bolts 20 from the lower surface of the seat pan 8. Accordingly, the airbag module 10 is fixed to the seat pan 8.

In this occupant protection system, before the airbag module 10 is mounted to the seat pan 8, the airbag 12 and the gas generator 14 have been joined to the retainer 16 and also the airbag 12 has already been folded, which facilitates the assembly work of the airbag module 10 to the seat pan 8.

According to this embodiment, although the patches 22 and the first nuts 24 which join the airbag 12 to the retainer 16 project downward from the lower surface of the retainer 16, the airbag module housing 8*d* has the recess 28 in the bottom for accommodating them. Accordingly, when the retainer 16 is disposed in the airbag module housing 8*d*, the patches 22 and the first nuts 24 are accommodated in the recess 28, so that the retainer 16 is brought into close contact with the bottom of the airbag module housing 8*d* through the airbag 12. Thus, the lower part of the airbag 12 is firmly clamped between the retainer 16 and the bottom of the airbag module housing 8*d* to stable the position of the inflated airbag 12.

Figure 10:
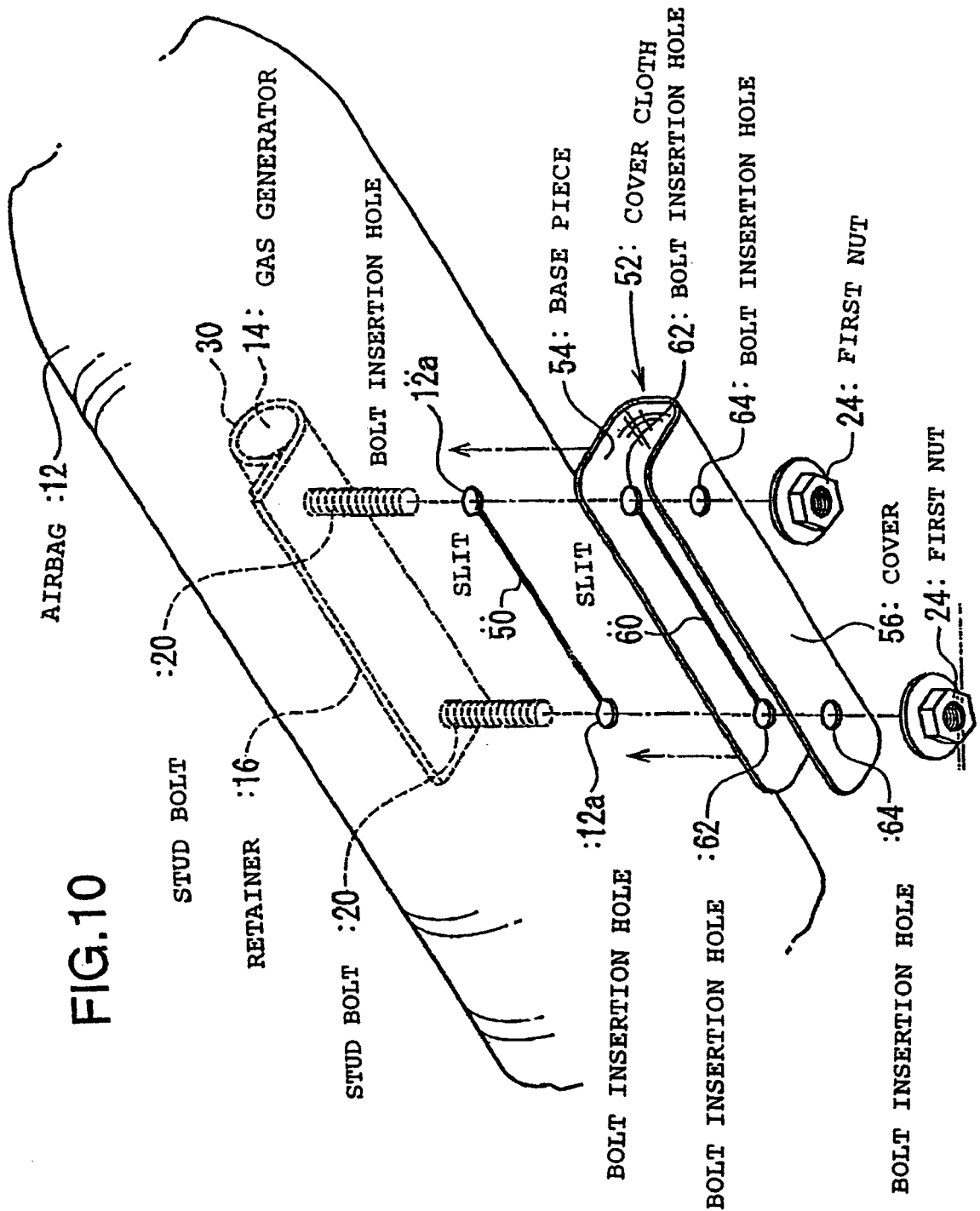
FIG. 10 is an exploded perspective view of a structure in which a gas generator and a retainer are arranged in the airbag.
Figure 11:
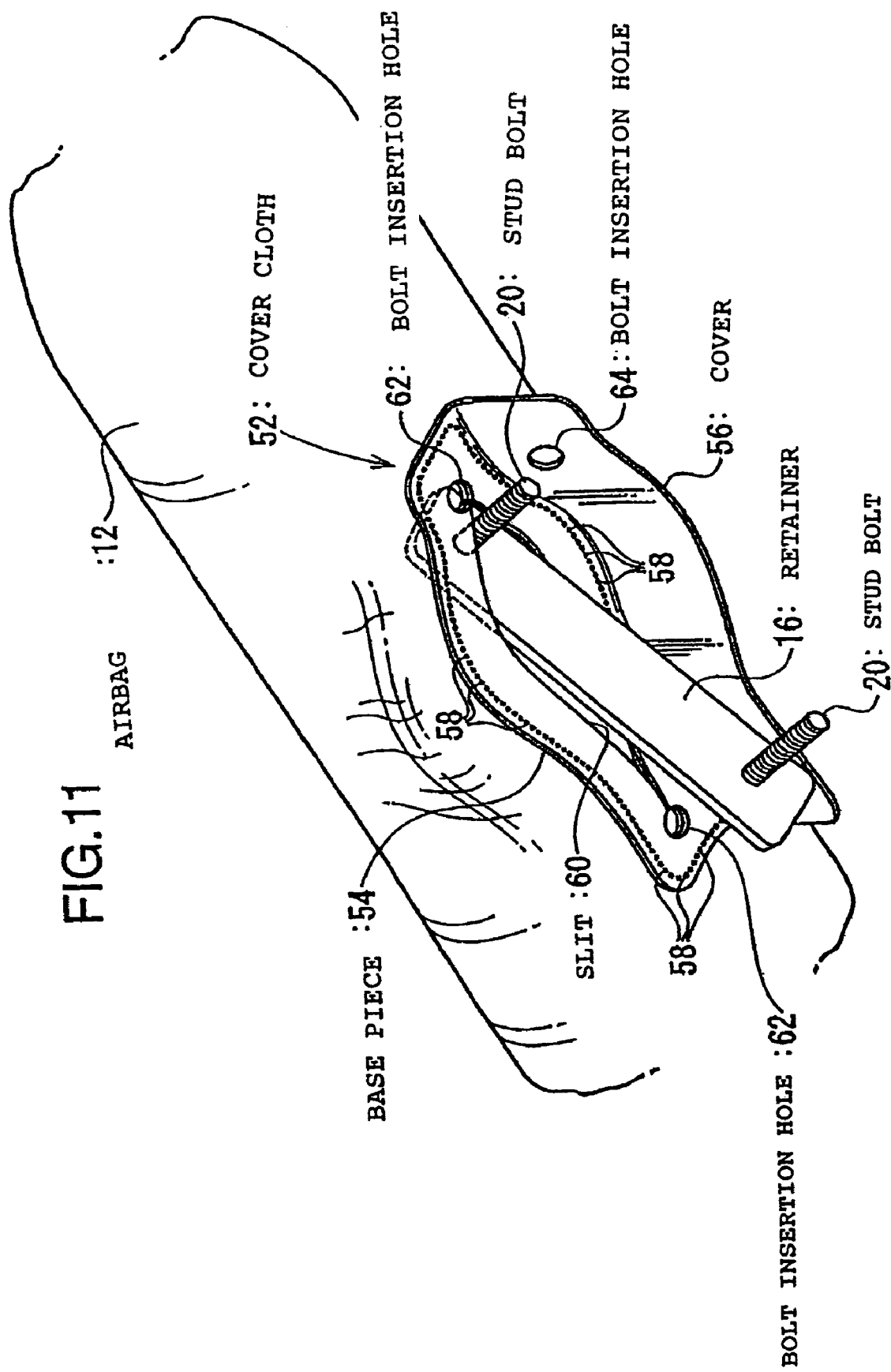
FIG. 11 is a perspective view of the gas generator and the retainer being inserted into the airbag.
Figure 12:
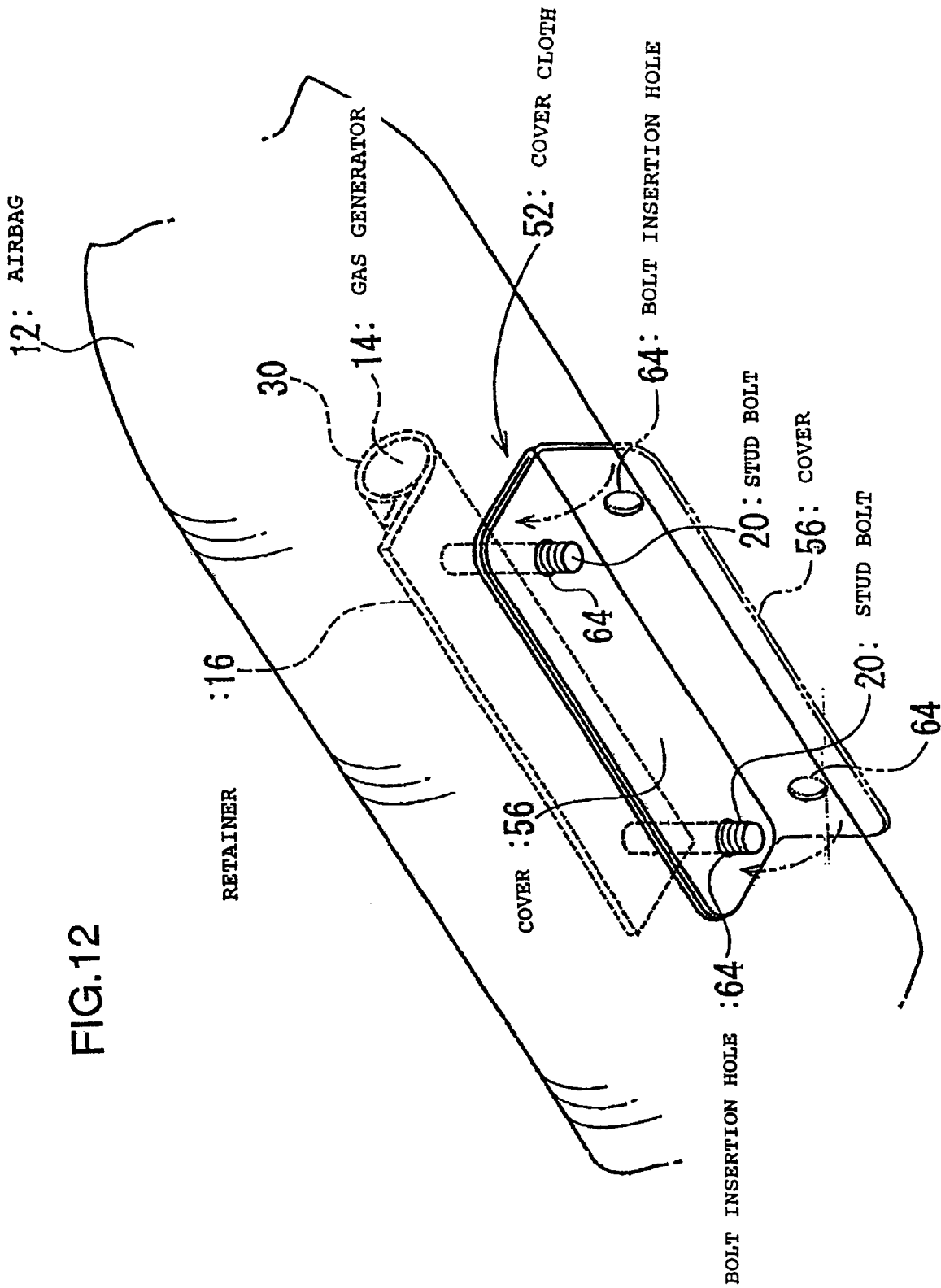
FIG. 12 is a perspective view of the airbag in which the gas generator and the retainer have been arranged.

Referring now to FIGS. 10 to 12, the structure in which the gas generator 14 and the retainer 16 are arranged in the airbag 12, which has not been shown in FIGS. 1 to 6, will be described hereinafter.

FIG. 10 is an exploded perspective view of the structure in which the gas generator 14 and the retainer 16 are arranged in the airbag 12; FIG. 11 is a perspective view of the gas generator 14 and the retainer 16 being inserted into the airbag 12; and FIG. 12 is a perspective view of the airbag 12 in which the gas generator 14 and the retainer 16 have been arranged.

Referring to FIG. 10, the airbag 12 has a slit (cut) 50 in the lower surface, for the gas generator 14 and the retainer 16 to insert. As illustrated, the airbag 12 has two bolt insertion holes 12a in the lower surface, for the two stud bolts 20 projecting from the lower surface of the retainer 16 to pass through. While opposite ends of the slit 50 connect to the bolt insertion holes 12a, the arrangement of the slit 50 is not limited to that. For example, the slit 50 may be arranged in a position remote from the bolt insertion holes 12a. The width and the length of the slit 50 are set as appropriate depending on the size of the gas generator 14 and the retainer 16.

The airbag 12 also has a cover cloth 52 on the lower surface, for covering the slit 50 and the bolt insertion holes 12a. One half of the cover cloth 52 is a base piece 54 attached to the periphery of the slit 50 and the bolt insertion holes 12a with mounting means such as stitching, while the other half is a cover 56 folded on the base piece 54. Numeral 58 in FIG. 11 denotes a seam made of sewing thread or the like that joins the base piece 54 to the lower surface of the airbag 12.

The base piece 54 has a slit 60 similar to the slit 50 of the airbag 12 and two bolt insertion holes 62 for the stud bolts 20 to pass through, which overlap concentrically with the bolt insertion holes 12a of the airbag 12, respectively. Opposite ends of the slit 60 also connect to the bolt insertion holes 62, respectively. The arrangement, however, is not limited to that. For example, the slit 60 may be arranged remote from the bolt insertion holes 62, as with the slit 50. The width and the length of the slit 60 are also set as appropriate depending on the size of the gas generator 14 and the retainer 16.

The cover 56 also has two bolt insertion holes 64 for the stud bolts 20 to pass through, which overlap concentrically with the bolt insertion holes 62 of the base piece 54, respectively, when the cover 56 is folded on the base piece 54. However, the cover 56 has no slits such as the slits 50 and 60; when the cover 56 is folded on the base piece 54, the respective slits 60 and 50 of the base piece 54 and the airbag 12 are closed with the cover 56.

When the gas generator 14 and the retainer 16 are disposed inside the airbag 12, first, the gas generator 14 is locked to the bracket 30 of the retainer 16 in advance. Referring to FIG. 11, the retainer 16 with the gas generator 14 is inserted into the airbag 12 through the slits 60 and 50 so as to expand the slit 60 of the base piece 54 of the cover cloth 52 and the slit 50 of the airbag 12.

After the whole of the retainer 16 with the gas generator 14 has been inserted into the airbag 12, the cover 56 of the cover cloth 52 is folded on the base piece 54, in which case the contact surface of the cover 56 and the base piece 54 may be coated with a sealing member or the like. The stud bolts 20 are extended from the interior of the airbag 12 to the exterior through the respective bolt insertion holes 12a, 62, and 64 of the airbag 12, the base piece 54, and the cover 56.

Thereafter, the first nuts 24 are tightened to the stud bolts 20 to join the airbag 12 and the retainer 16 together. At that time, the ground fabric of the airbag 12 and the base piece 54 and the cover 56 of the cover cloth 52 are clamped by the retainer 16 and the first nuts 24, so that the cover 56 is brought into close contact with the base piece 54 to close the slits 60 and 50. Accordingly, the gas from the gas generator 14 is prevented from flowing to the exterior of the airbag 12 through the slits 50 and 60 when the gas generator 14 is activated.

Although the above embodiment has the recess 28 in the bottom of the airbag module housing 8d (seat pan 8), for accommodating the patches 22 and the first nuts 24, the recess may be provided at the lower surface of the retainer, as in the embodiment of FIG. 7. Alternatively, the recess may be provided to both of the retainer and the seat pan, which are opposed to each other to form a space for accommodating the patches and the nuts.

An airbag module 10A of FIG. 7 includes a retainer 16A in the airbag 12. The retainer 16A is placed on the inner surface of the airbag 12 so as to push the lower part of the airbag 12 from the interior of the airbag 12 against the bottom of the airbag module housing 8d of the seat pan 8. Also in this embodiment, the stud bolts 20 project downward from the lower surface of the retainer 16A. Each stud bolt 20 is passed through the bolt insertion hole (not shown in FIG. 7) in the lower part of the airbag 12, to which the first nut 24 is tightened from the exterior of the airbag 12 through the patch 22; thus, the airbag 12 is joined to the retainer 16A.

The embodiment has no recess for accommodating the patches 22 and the first nuts 24 in the bottom of the airbag module housing 8d; instead, it has a recess 28A for accommodating the patches 22 and the first nuts 24 in the lower surface of the retainer 16A.

Other arrangement of the occupant protection system including the airbag module 10A is the same as that of the occupant protection system of FIGS. 1 to 6; the same numerals of FIG. 7 as those of FIGS. 1 to 6 designate the same components.

In the occupant protection system of FIG. 7, the patches 22 and the first nuts 24 which join the airbag 12 to the retainer 16A are accommodated in the recess 28A in the lower surface of the retainer 16A. Accordingly, when the retainer 16A is arranged in the airbag module housing 8d, the retainer 16A is brought into close contact with the bottom of the airbag module housing 8d through the airbag 12 without the retainer 16A being separated from the bottom of the airbag module housing 8d by the distance corresponding to the thickness of the patches 22 and the first nuts 24.

Providing the retainer with the recess for accommodating the patches and the nuts for joining the airbag, as in the occupant protection system of FIG. 7 eliminates the necessity of forming the recess in the seat pan, allowing the conventional seat pan without the recess to be used.

While the above-described embodiments use a plate-like retainer, the structure of the retainer is not limited to that.

For example, an airbag module 10B of FIG. 8 uses a substantially box-shaped gas generator holder 16B as retainer. This embodiment includes the gas generator 14 in the gas generator holder 16B.

The gas generator holder 16B has an open area 16b on the top. A jet of gas from the gas generator 14 is issued upward through the open area 16b.

The lower surface of the gas generator holder 16B is flat. The gas generator holder 16B is disposed in the airbag 12, the lower surface of which is placed on the inner surface of the lower part of the airbag 12. The stud bolts 20 project downward from the lower surface of the gas generator holder 16B and extend to the exterior of the airbag 12 through bolt insertion holes (not shown) at the lower part of the airbag 12. The first nuts 24 are tightened to the stud bolts 20 through the patch 22, so that the airbag 12 is joined to the gas generator holder 16B.

The embodiment has the recess 28 in the bottom of the airbag module housing 8d of the seat pan 8, for accommodating the patches 22 and the first nuts 24. The width of the recess 28 is smaller than that of the gas generator holder 16B. Accordingly, when the gas generator holder 16B is disposed in the airbag module housing 8d, the patches 22 and the first nuts 24 which project from the lower surface of the gas generator holder 16B are accommodated in the recess 28 and the lower surface of the gas generator holder 16B is brought into close contact with the bottom of the airbag module housing 8d through the airbag 12. Other structure of the occupant protection system of FIG. 8 is the same as that of the occupant protection system of FIGS. 1 to 6.

The above-described embodiments use a bag-shaped enclosure that covers the entire folded airbag as the enclosure for covering the airbag so as to restrain the airbag in a folded condition. The structure of the enclosure, however, is not limited to that.

For example, an airbag 12A of an airbag module 10C of FIG. 9(a) includes brackets 40 on the left and right opposite ends for joining the airbag 12A to a seat pan (not shown) and openings 18a on the left and right opposite ends of the enclosure 18A for extending the brackets 40 outwards. Numeral 40a denotes an insertion hole for a bolt (not shown) for fixing each bracket 40 to the seat pan.

An enclosure 18B of an airbag module 10D of FIG. 9(b) is shaped like a tube surrounding the center of the length of the folded airbag 12.

An enclosure 18C of an airbag module 10E of FIG. 9(c) is shaped like a band wound around the intermediate of the length of the folded airbag 12.

When the enclosures that are constructed to enclose the folded airbag are used, such as the enclosure 18B of FIG. 9(b) and the enclosure 18C of FIG. 9(c), the displacement of the enclosures can be prevented by arranging them such that the stud bolts projecting from the retainer pass through the enclosures or the enclosures are in contact with the stud bolts.

It is to be understood that the above-described embodiments are merely examples of the invention and the invention is not limited to those. For example, in the embodiments, the joining of the airbag to the retainer and the fixing of the retainer to the seat pan are made with common stud bolts. Alternatively, the stud bolt for joining the airbag to the retainer and the stud bolt for fixing the retainer to the seat pan may be provided separately. The means for joining the airbag to the retainer and the means for fixing the retainer to the seat pan are not limited to the stud bolt and the nut.

What is claimed is:

1. An occupant protection system:
   a vehicle seat;
   a seat pan for the seat;
   an airbag;
   a gas generator in the airbag;
   a holder for the generator, the holder being secured to the airbag with the holder in the airbag;
   a restraining enclosure extending at least partially around the airbag sized to restrict inflation thereof;
   an outer housing for the airbag, the restraining enclosure, the gas generator and the holder, with the outer housing being disposed under the seat and integrated with the seat pan so as to be distinct from the restraining enclosure, and configured to allow the airbag to be deployed to exert pressure on the seat thereabove, wherein the airbag is folded, and the restraining enclosure includes one of a bag, a tube and a band that extends at least partially around the folded airbag,
   aligned apertures in the holder, the airbag, the enclosure, and the outer housing, and
   a threaded fastening device including an elongate threaded potion for extending through the aligned apertures.

2. The occupant protection system of claim 1 wherein the holder comprises a retainer configured to be secured to the gas generator.

3. The occupant protection system of claim 1 wherein the threaded fastening device comprises a threaded bolt with the elongate threaded portion being a threaded shank of the bolt, and the threaded fastening device further comprising a first nut threaded on the shank for clamping the airbag to the holder, and a second nut threaded on the shank for securing the airbag to the outer housing with the first and second nuts being on opposite sides of the outer housing.

4. The occupant protection system of claim 1 wherein the airbag includes a slit sized to allow the gas generator and the holder to be fit therethrough.

5. The occupant protection system of claim 4 wherein the airbag has a cover portion for closing the airbag slit with the gas generator and holder therein.

6. An occupant protection system for a vehicle, the occupant protection system comprising:
   a subassembly including a gas generator and an airbag with the gas generator disposed in the airbag;
   an elongate slit and an aperture in the airbag;
   a fastening device having an elongate shank for keeping the airbag secured to the gas generator therein prior to vehicle installation; and
   a foldable cover having an attached portion secured to the airbag with the attached portion having a slit and an aperture aligned with the slit and the aperture of the airbag, and a cover portion for being folded over the attached portion with the cover portion having an aperture to be aligned with the airbag and attached portion apertures for allowing the shank to extend therethrough, the aligned slits of the airbag and the attached portion allowing the gas generator to be inserted in the airbag therethrough with the cover portion then folded onto and secured to the attached portion to cover the aligned slits with the shank extending through the aligned apertures.

7. The occupant protection system of claim 6 wherein the fastening device comprises a threaded bolt and nut.

8. The occupant protection system of claim 6 wherein the subassembly includes a retainer for the gas generator with the fastening device clamping the airbag against the retainer.

9. The occupant protection system of claim 6 wherein the airbag is folded and the subassembly includes an enclosure that extends at least partially around the folded airbag.

10. The occupant protection system of claim 6 wherein the elongate shank of the fastening device includes a threaded stud projecting from the airbag, and the fastening device includes a pair of nuts for being threaded on the threaded stud with one nut securing the airbag to the generator therein on one side of vehicle structure to which the airbag is mounted and the other nut securing the subassembly to the vehicle structure with the other nut on the other side of the vehicle structure.

11. The occupant protection system of claim 6 wherein the subassembly includes a retainer and the fastening device includes a nut outside the airbag disposed between the airbag and vehicle structure to which the subassembly is secured.

12. The occupant protection system of claim 11 in combination with the vehicle wherein the vehicle structure includes a seat pan with one of the retainer and seat pan including a recess having a depth sized substantially the same as a thickness of the fastening device nut received therein.

13. A method for installing an occupant protection system to a vehicle, the method comprising:

attaching a base portion of a foldable cover to an airbag so that a slit in the attached base portion of the cover is aligned with a slit in the airbag;

inserting a gas generator in the airbag through the aligned slits in the cover base portion and airbag;

folding a cover portion of the foldable cover onto the attached base portion and securing the cover portion thereto to cover the aligned slits;

forming a subassembly with the gas generator and the airbag so that a mounting stud associated with the gas generator extends through an aperture in the airbag and stays projecting exteriorly therefrom during vehicle installation of the subassembly; and securing the subassembly to the vehicle with the projecting mounting stud thereof.

14. The method of claim 13 wherein forming the subassembly includes clamping the airbag to a retainer for the generator prior to securing the subassembly to the vehicle.

15. The method of claim 13 wherein the subassembly is formed by threading a first nut along the mounting stud, and the subassembly is secured to the vehicle by threading a second nut along the mounting stud.

16. The method of claim 13 wherein inserting the gas generator in the airbag includes inserting the mounting stud through aligned apertures of the airbag and the cover base portion, and folding the cover portion includes passing the projecting mounting stud through an aperture in the cover portion as the cover portion is folded onto the base portion.

\* \* \* \* \*

UNITED STATES PATENT AND TRADEMARK OFFICE
CERTIFICATE OF CORRECTION

| | |
|---|---|
| PATENT NO. | : 7,306,257 B2 |
| APPLICATION NO. | : 10/842232 |
| DATED | : December 11, 2007 |
| INVENTOR(S) | : Hiromichi Yoshikawa and Katsuyuki Sakai |

It is certified that error appears in the above-identified patent and that said Letters Patent is hereby corrected as shown below:

Claim 1, Column 8, line 6, delete "potion" and insert -- portion -- therefor

Signed and Sealed this

Sixth Day of May, 2008

JON W. DUDAS
*Director of the United States Patent and Trademark Office*